United States Patent [19]

Byers et al.

[11] Patent Number: 5,524,397
[45] Date of Patent: Jun. 11, 1996

[54] FRAMING SYSTEM FOR WOOD FRAME BUILDINGS

[76] Inventors: Gary L. Byers; Timothy W. Byers, both of P.O. Box 550, Whitefish, Mont. 59937

[21] Appl. No.: 410,694

[22] Filed: Mar. 27, 1995

[51] Int. Cl.$^6$ .................................................... E04B 7/04
[52] U.S. Cl. ................ 52/92.2; 52/702; 52/712; 52/715; 403/232.1; 403/403
[58] Field of Search ........................... 52/702, 712, 713, 52/92.1, 92.2, 703, 714, 715; 403/232.1, 230, 403; 248/300

[56] References Cited

U.S. PATENT DOCUMENTS

| | | |
|---|---|---|
| 560,947 | 5/1896 | Summerer . |
| 1,369,837 | 3/1921 | Price . |
| 2,413,363 | 12/1946 | Maxwell et al. ........................ 20/92 |
| 3,312,485 | 4/1967 | Koenigshof ........................ 287/20.92 |
| 3,333,875 | 8/1967 | Tracy ................................... 287/20.94 |
| 3,414,300 | 12/1968 | Spane ................................. 287/20.92 |
| 3,481,635 | 12/1969 | Tracy ................................... 287/20.94 |
| 3,537,221 | 11/1970 | Helfman et al. ...................... 52/714 X |
| 3,596,941 | 8/1971 | Tracy ................................... 287/20.94 |
| 3,836,270 | 9/1974 | Chmabers ............................. 403/218 |
| 4,086,431 | 2/1978 | Burvall ................................. 403/171 |
| 4,192,400 | 3/1980 | Mitchell .............................. 248/300 X |
| 4,411,547 | 10/1983 | Johnson ................................ 403/205 |
| 4,498,801 | 2/1985 | Gilb ..................................... 403/232.1 |
| 5,150,982 | 9/1992 | Gilb ..................................... 403/232.1 |
| 5,156,484 | 10/1992 | Allen ..................................... 403/95 |
| 5,274,981 | 1/1994 | Commins ................................ 52/712 |
| 5,364,312 | 11/1994 | Cunard et al. ...................... 403/403 X |
| 5,380,115 | 1/1995 | Colonias ............................. 403/403 X |
| 5,410,854 | 5/1995 | Kimmell et al. ..................... 52/715 X |
| 5,448,871 | 9/1995 | Newman et al. ..................... 52/702 X |
| 5,457,928 | 10/1995 | Sahnazarian ..................... 403/232.1 X |

*Primary Examiner*—Creighton Smith
*Attorney, Agent, or Firm*—Harry M. Cross, Jr.

[57] ABSTRACT

A framing system, according to the present invention, comprises a base frame and multiple framing arches attached to the base frame at selected intervals. Each framing arch comprises a pair of lumber leg segments, a pair of lumber roof rib segments, angle frame connectors joining each leg segment to a roof rib segment and joining one roof rib segment to another roof rib segment, base frame connectors joining each leg segment to the base frame, and lumber edge segment and a lumber ridge segment. The edge segments extend transversely of the framing arches with each edge segment being mounted in the angle frame connectors that join leg segments to roof rib segments on one side of the framing system. The ridge segment extends transversely of the framing arches and is mounted in the angle frame connectors that join one roof rib segment to another roof rib segment.

6 Claims, 6 Drawing Sheets

FRAMING SYSTEM FOR WOOD FRAME BUILDINGS

BACKGROUND OF THE INVENTION

1. Field of the Invention

This invention relates framing systems for use in constructing wood frame buildings, and more particularly to sheet metal connectors used to join wood framing members together.

2. Brief Description of the Prior Art

Many efforts and devices have been provided to make it easier to assemble a wood-framed building. In particular, efforts have been made to provide systems and devices for use by unskilled workman that can be used to assemble a structurally-sound building frame without the knowledge and skill of a skilled craftsman. These efforts have included the provision of metal connectors or brackets designed to be used to connect, by way of example, rafters to ridge beams, rafters to wall studs, posts or wall studs to bases, and posts or wall studs to sill plates. Such metal connectors or brackets, however, have often been relatively expensive or have been cumbersome to use, to such an extent that they are not usually employed for building simple frame structures of the kind contemplated by the present invention.

SUMMARY OF THE INVENTION

A framing system, according to the present invention, comprises a base frame and multiple framing arches attached to the base frame at selected intervals. Each framing arch comprises a pair of lumber leg segments, a pair of lumber roof rib segments, angle frame connectors joining each leg segment to a roof rib segment and joining one roof rib segment to another roof rib segment, base frame connectors joining each leg segment to the base frame, and lumber edge segment and a lumber ridge segment. The edge segments extend transversely of the framing arches with each edge segment being mounted in the angle frame connectors that join leg segments to roof rib segments on one side of the framing system. The ridge segment extends transversely of the framing arches and is mounted in the angle frame connectors that join one roof rib segment to another roof rib segment.

Each angle frame connector comprises a plate having a first side portion for receiving an end portion of a first lumber segment oriented parallel to the connector, a second side portion for receiving an end portion of a second lumber segment oriented parallel to the connector and co-planar with the first lumber segment, and a central portion for receiving a third lumber segment oriented transversely to the connector and transversely to the first and second lumber segments. The plate has an inner side and an outer side, and has a plurality of peripheral tabs extending at 90° from the inner side, including a first aligning tab extending along a first edge of the plate on the first side portion, a second aligning tab extending along a second edge of the plate on the second side portion, the two tabs being oriented at an obtuse angle relative to one another, and a pair of parallel side tabs and a bottom tab defining a three-sided rectangular slot in the central portion between the first and second aligning tabs. The first and second aligning tabs and the slot are constructed and arranged whereby an outer edge of the plate is defined by the first and second aligning tabs as having two straight edges extending at an obtuse angle with respect to one another and terminating at opposite outer edges of the slot.

Each base frame connector comprises a plate having first and second side portions and a central portion, the plate having an inner side and an outer side. The side portions are adapted for fastening to the base frame and the central portion is adapted for fastening to the base frame and to a leg segment. The plate has a pair of parallel ribs formed therein such that each rib defines a flute in the inner side and a corresponding bead in the outer side. The parallel ribs define parallel vertical edges of the central portion and are so constructed and arranged that a selected side portion may be bent at 90° to the inner side along an adjacent one of the parallel ribs whereby the bent side portion may be attached to an end of the base frame.

DESCRIPTION OF THE PREFERRED EMBODIMENT

Figure 1:
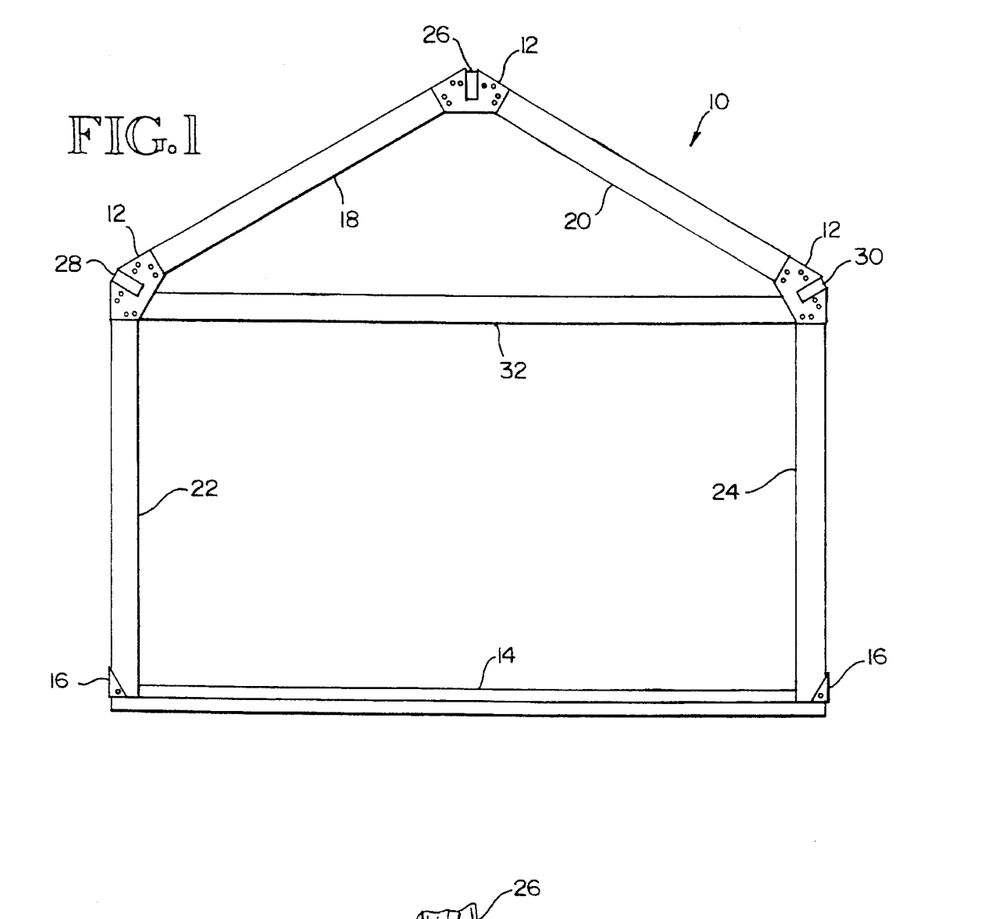
FIG. 1 is an end elevation view of an arch constructed in accordance with the principles of this invention employing preferred angle frame connectors and preferred base frame connectors.

The simplified framing system of this invention provides two or more arches 10 which are joined together into a unitary structure by means of connector elements herein termed "angle frame connectors" 12. Each arch 10 is joined to a base 14 by means of connector elements herein termed "base frame connectors" 16. The angle frame connectors 12 and base frame 16 connectors are preferably fabricated from sheet metal by conventional die cutting and press-forming or stamping techniques. The simplified framing system of this invention is particularly designed for assembly using nominal 2×4 inch lumber. The system does not require cutting the lumber except for straight, perpendicular cutting of the lumber to the desired lengths. Consequently, the assembly of this frame system is well within the skill of an ordinary home craftsman; no skilled technique is required. A pair of top angle frame connectors 12 join two roof rib boards 18, 20. A pair of left side angle frame connectors 12 join left rib 18 to a left side leg 22. A pair of right side angle frame connectors 12 join right rib 20 to a right side leg 24. Two or more such arches 10 are secured in line to the base 14 by their respective sets of left and right base frame connectors 16. The multiple arches 10 are joined together by a top ridge board 26 and by left and right edge boards 28, 30.

The ridge and edge boards 26, 28, 30 would extend the entire length of the structure that is composed of the multiple arches 10. The width and height of the structure would depend on the length of the rib boards 18, 20 and the length of the legs 22, 24, respectively. In order to provide for a door frame at one end of the structure, an overhead horizontal brace board 32 could be located to provide a top mounting of the vertical side members of the door frame. Depending on the height of the desired doorway, the brace board 32 could be secured to the end arch side legs or to the end arch rib boards, the former being shown in FIG. 1.

Figure 2:
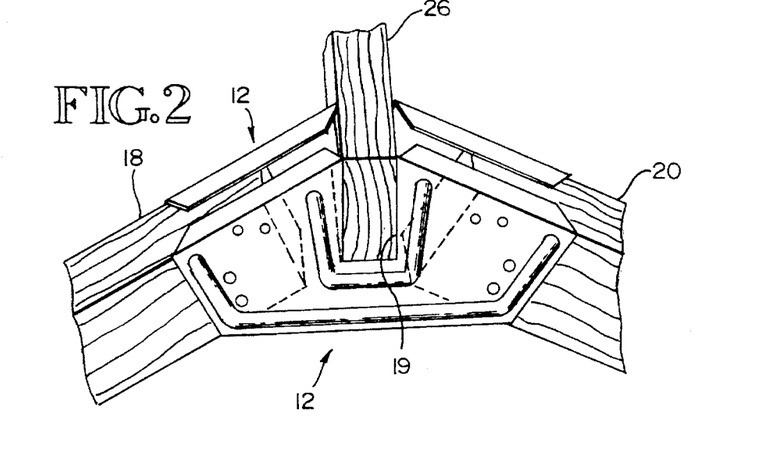
FIG. 2 is a detail view in perspective illustrating the assembly of two rafters and a ridge beam by means of preferred angle frame connectors.
Figure 5:
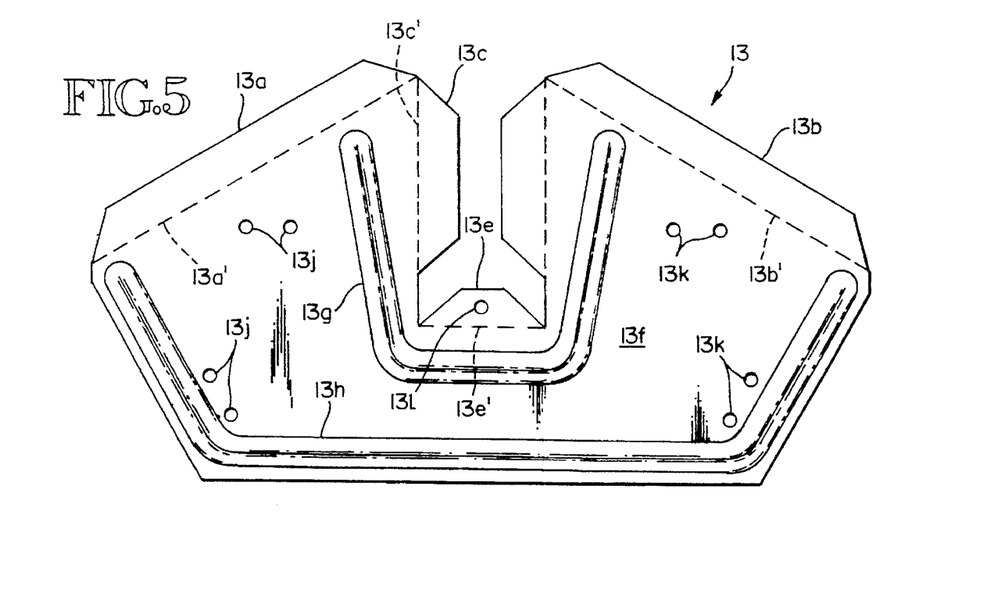
FIG. 5 is a plan view of sheet metal blank illustrating the bend lines for forming the preferred angle frame connector.

The angle frame connectors 12, FIGS. 2 and 5–8, are intended for use in pairs one on either side of the lumber segments that they join. This is shown in FIG. 2 with respect to joining two roof ribs 18, 20, but the same principle applies to joining a roof rib to a leg, 22 or 24. The angle frame connectors 12 have an outer face 15 and an inner face 17, the latter designed to be placed in contact with the lumber segments. The angle frame connectors are fabricated from sheet metal by die-cutting and press-forming operations. The sheet metal is first cut to provide a blank 13 with the outline shown in FIG. 5. Blank 13 is provided with tabs 13a, 13b, 13c, 13d and 13e that are designed to be bent along bend lines 13a', 13b', 13c', 13d' and 13e'. In a subsequent forming operation, these tabs will be bent perpendicularly along their bend lines so as to extend at 90° inward from the blank's outer face 13f. With respect to FIGS. 6–8, these bent tabs of blank 13 become, respectively, connector tabs 12a, 12b, 12c, 12d and 12e. During the forming operation, the blank 13 is fluted to provide two elongated flutes on the inner surface and corresponding elongated beads 13g and 13h in the outer surface 13f. With respect to FIGS. 6–8, these flutes/beads become, respectively, beads 12g and 12h in the connector outer surface 15 and, correspondingly, flutes 12g' and 12h' in the connector inner surface 17. During the forming operation the forming die deforms the blank, thereby creating the flutes (i.e. elongated narrow depressions) 12g' and 12h' in the inner surface 17, and these deformations result in beads (i.e. elongated narrow protrusions) 12g and 12h that protrude from the outer surface 15. Blank 13 is also punched to provide multiple nail/screw holes as shown in FIG. 5 at 13j, 13k in the face of the blank and at 13l in tab 13e before the tabs are bent. These nail/screw holes in the blank are equivalent, in the finished connector of FIGS. 5–8, to nail/screw holes 12j, 12k and 12l.

Figure 8:
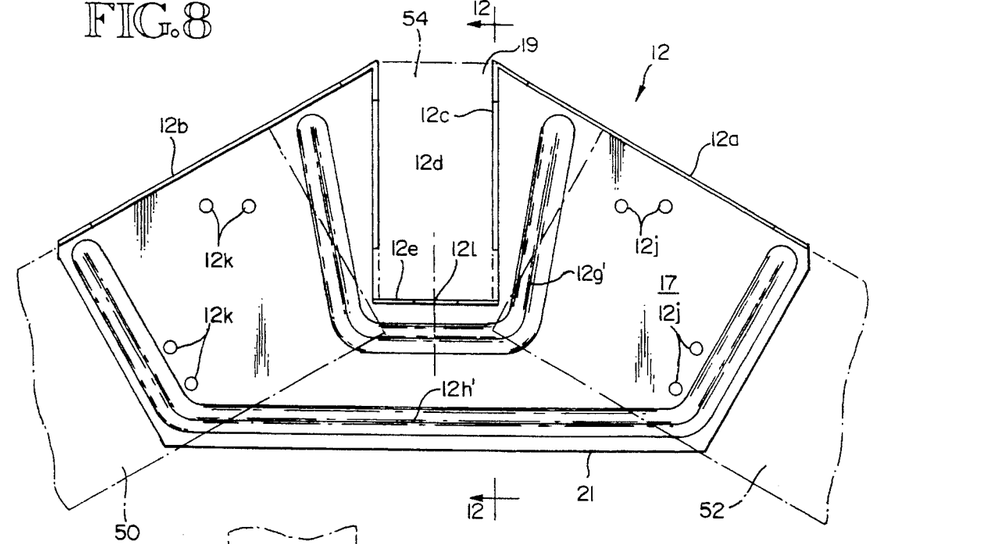
FIG. 8 is a plan view of the preferred angle frame connector illustrating in dotted line the assembly of two rafters and a ridge beam.

Referring to FIG. 8, the perpendicular tabs 12a, 12b provide aligning surfaces for locating the ends of lumber segments 50, 52. As thus located, the tabs 12a, 12b overlay and contact the narrow edges of the lumber segments 50, 52. Lumber segments 50, 52 may then be fastened to the connector 12 by nails or screws applied through the nail/screw holes 12k, 12l. Because the intended preferred use of connectors 12 is in pairs, with one connector being located on either side of a lumber segment 50 or 52, the aligning tabs 12a, 12b must be less than one half the anticipated width of the lumber segment so that the opposing tabs of opposite connectors will not contact one another. In a typical and preferred construction, tabs 12a, 12b form an obtuse angle of about 120°. The tabs 12a, 12b are flat and long enough to provide an adequately-long aligning surface whereby a lumber segment 50 or 52 may be placed against the inner side of a tab and aligned parallel therewith.

Tabs 12c, 12d and 12e define the sides and bottom of a rectangular slot 19 for receiving a lumber cross segment 54. The slot 19 is configured to be only slightly larger than the anticipated width and depth of the lumber segment 54. In the preferred use of the connector 12, which is designed for use with nominal 2×4 lumber, the width and depth of the slot 19 would accommodate a 2×4 segment set on edge in the slot 19. As in the case of tabs 12a, 12b, tabs 12c, 12d and 12e must have a width slightly less than one half of the thickness of a 2×4 segment so that the tabs on the corresponding opposite connector will not contact one another. The connector may be fastened to the cross segment 54 by a nail or screw applied through the nail/screw hole 12l.

The angle frame connector 12, used in pairs to join two lumber segments such as two roof ribs or a roof rib and an arch leg, must provide a satisfactory degree of structural stability and strength inasmuch as the connector pair constitutes the sole joint between the adjacent ends of the lumber segments. To enable the connector to satisfactorily resist buckling and bending forces, the connector is provided with the beads 12g' and 12h'. These beads are somewhat U-shaped in that they each have a center straight section that extends between the two halves of the connector and an upturned section at the end of each straight section that extends transversely across the lumber segment-contacting portion of each connector half. Each upturned end section joins its straight center section at an obtuse angle. The straight sections are parallel to one another and centered below the lumber cross segment slot 19. The straight center section of the lower bead 12h' is significantly longer than the straight center section of the upper bead 12g', on the order of four times longer. The combination of the two beads 12g', 12h' satisfactorily minimizes the likelihood that the joint between the lumber segments 52, 54 could twist, bend or buckle across the connector 12.

Figure 12:
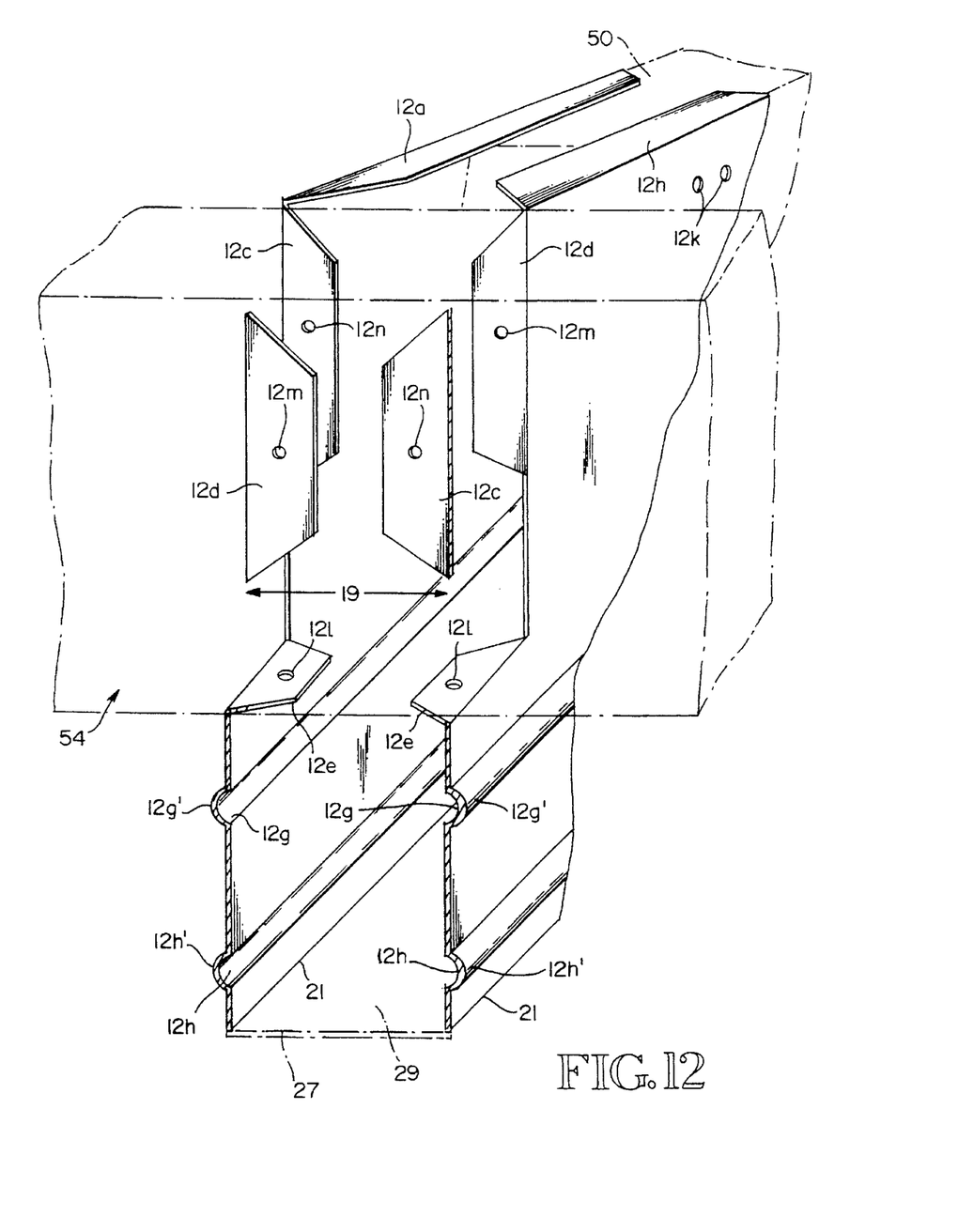
FIG. 12 is a view in perspective through line 12—12 in FIG. 8 illustrating two angle frame connectors joining an arch to a ridge board.

FIG. 12 illustrates the relationship among a pair of angle frame connectors 12, a ridge/edge board 54 and a rib/leg board 50. In this relationship, the tabs 12e at the bottom of the slot 19 enable the ridge/edge board to be fastened through the nail/screw holes 12l. Screw/nail holes 12m and 12n could be provided in the vertical tabs 12d and 12c at the sides of the slot 19 for fastening the angle frame connectors to the sides of the ridge/edge board 54.

Figure 3:
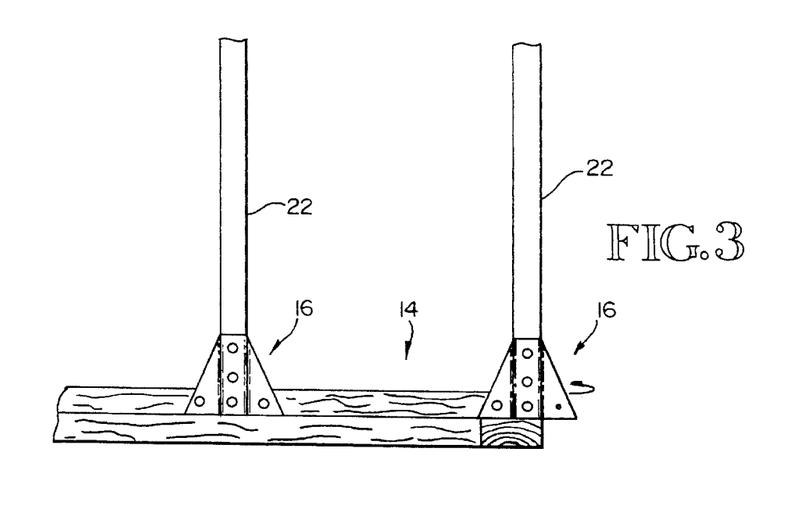
FIG. 3 is a detail view in side elevation illustrating the assembly of two side legs to a base member by means of preferred base frame connectors.
Figure 4:
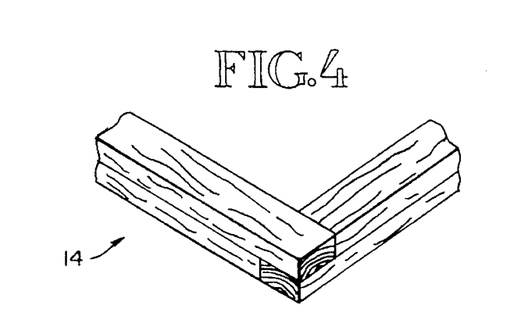
FIG. 4 is a detail view in perspective illustrating a preferred base member end assembly.
Figure 9:
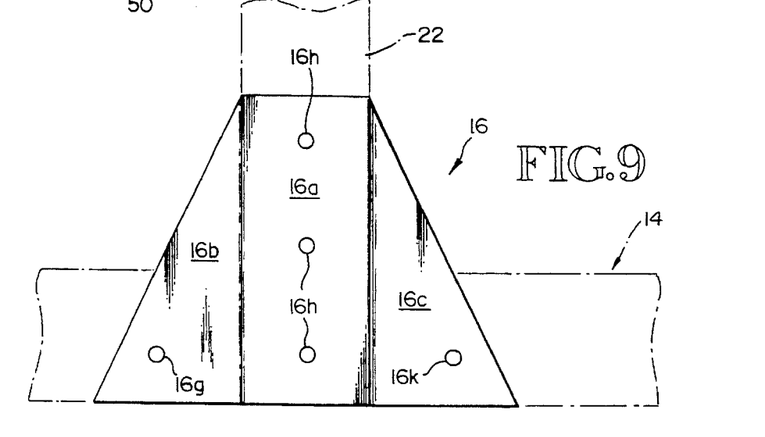
FIG. 9 is a plan view of the preferred base frame connector illustrating in dotted line the assembly of an arch side leg and a base member.
Figures 10, 11:
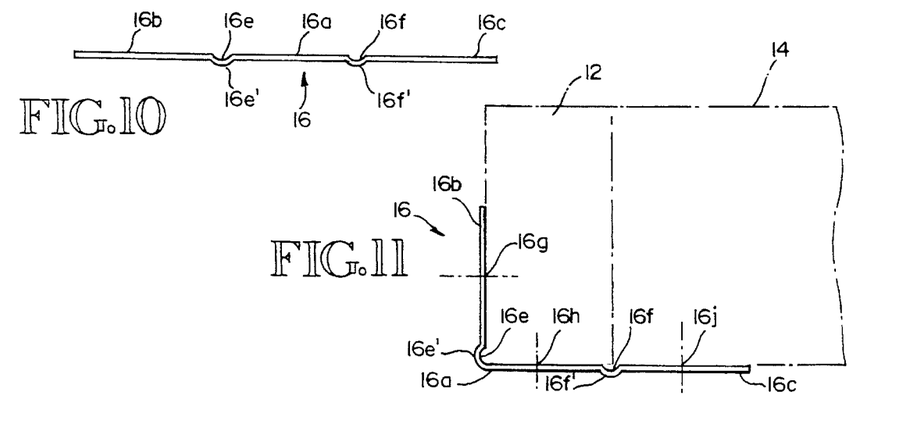
FIG. 10 is a bottom edge view of the FIG. 9 base frame connector.
FIG. 11 is a top edge view of a preferred base frame connector used to assemble an end arch side leg to a base member.

The base frame connector 16, as shown in FIGS. 3 and 9–11, comprises an upstanding rectangular mid-section 16a flanked by two triangular-shaped end sections 16b, 16c. This connector 16 is fabricated from sheet metal by die-cutting and press-forming operations. The sheet metal is first cut to provide the outline shown in FIG. 9. The blank thus cut is then formed to provide two parallel flutes 16e, 16f on the inner surface of the connector, and corresponding beads 16e', 16f' in the outer surface of the connector, as shown in FIG. 10. The blank is also punched to provide multiple nail/screw holes 16g, 16k and 16h in the face of the blank as shown in FIG. 9. The base frame connector flutes/bead define the vertical edges of the mid-section 16a and provide structural strength to the connector. In addition, the connector flutes/bead provide bend lines so that the end sections 16b, 16c can be bent perpendicular to the mid-section 16c as shown in FIG. 11. Where the connector 16 is to be used to anchor arch legs at the corners or ends of the structure, the normally-planar connector would be bent so that one of the bead/flutes would be located on the outer corner of the leg with the adjacent end section bent around to contact the end surface of the leg; this being shown in FIG. 11 with respect to bead/flute 16e'/16e and end section 16b. Where the connector 16 is to be used to anchor arch legs other than at the corners or ends of the structure, the connector is secured to the base 14 and the leg 22 in its planer configuration as shown in FIG. 9. FIG. 3 illustrates two connectors 16 securing two legs 22 to the base 14, the left connector securing a mid leg and the right connector securing a corner or end leg. For securing the end leg, the connector 16 would usually be fastened through its end section and mid section to the base and leg, respectively, and then the other end section would be bent around its adjacent bead/flute and fastened to the perpendicular end of the base 14. The connector mid section 16a is provided with a width equal to about the expected width of the leg 22 so that the vertical and parallel bead/flutes also provide guide lines for lining up the leg 22 in the middle of the connector. Consequently, each bead/flute will be located at the edge of the leg 22 as seen in FIGS. 9 and 11.

To erect the simplified frame system shown in FIGS. 1–4, the base frame 14 would be first installed. This base frame 14 can be made of two layers of 2×4 lumber laid on its face, with the base corners/ends overlapping in the manner shown in FIG. 4. Alternately, the base frame 14 could be made of 4×4 lumber with the corners/ends notched and overlapped to provide the FIG. 4 configuration. After assembling the base frame, the base frame connectors 16 would be installed using the lower line of three nail/screw holes shown in FIG. 16. The connectors would be installed so that the upper two nail/screw holes in the mid section 16a would be exposed above the base frame for use in attaching the legs 22.

The roof arches may be assembled by laying out two roof rib boards 18, 20 and overlaying their adjacent ends with an angle frame connector 12. The ribs 18, 20 would be aligned with the connector tabs 12a, 12b and the connectors would be secured to ribs using the nail/screw holes 12k, 12j. It is preferable to use screws to secure the ribs to the connectors, rather than nails; and it is preferable to make all securements mentioned herein by using screws rather than nails. Fast threading screws of the type used in installing sheetrock have become commonly used to screw lumber products together because they require no pre-drilling prior to use. Then the roof arch, as thus far assembled, would be carefully turned over and the other connector 12 of the pair would be aligned and secured to the ribs 18, 20 to produce the configuration shown in FIG. 2. In aligning the second connector 12 of the pair, it would be convenient to insert a short piece of 2×4 lumber in the slot 19 of the previously installed connector 12 and then position the second connector so that its slot 19 lines up with the installed connector. When the arch is complete as thus far described, two people—one at each leg—could raise the arch upright and position it on the base frame 14 at the locations of two base frame connectors 16 on either side of the base frame. While holding the arch in a vertical position with the legs 18, 22 vertical and aligned with the mid section 16a of each base frame connector 16, each person would secure a leg to the adjacent base frame connector, using the upper two nail/screw holes in the mid section 16a. Then each leg 18, 20 could also be toe-nailed to the inside of the base frame. The corner/end base frame connectors 16 would be secured to the corners/ends of the base frame in the position shown at the right of FIG. 16 and, when the leg 22 or 18 was secured to that connector's mid section 16a, the outer section 16b or 16c would be bent around the leg's outside corner and secured to the end of the base frame as shown in FIG. 11.

When all of the roof arches have been installed on the base frame 14, the edge and ridge boards 28, 30 and 26 can be installed. It is most convenient to install the edge boards 28, 30 before installing the ridge board 26. The edge boards are preferably installed by setting one end in the slot 19 of one of the side angle frame connectors 12 and then lowering the edge board down by pivoting it into the slots 19 of the remaining side angle frame connectors. When the edge boards are installed, the alignment of the arches should be checked with any adjustment being made to recenter the arch legs at the elevation of the side angle frame connectors. Then the edge boards can be secured to the side angle frame connectors by use of the bottom tab nail/screw holes 12l. To complete assembly of the framing structure, the ridge board 26 would be installed in the ridge angle frame connector slots 19 in the same manner as the edge boards were installed and secured to the angle frame connectors through the bottom tab nail/screw holes 12l. Prior to fastening the ridge board to its angle frame connectors, the alignment of the arches could be check and any necessary adjustment could be made at the elevation of the ridge angle frame connectors.

Because framing grade nominal 2×4 lumber may be bowed or warped, the ability of this framing system to adjust the alignment of the arches at both the elevation of the side angle frame connectors and the elevation of the ridge frame connectors can be very helpful in establishing a squared-up framework. Even through the arch legs 22, 24 are vertically fastened to the base frame connectors at four foot on centers, that alone will not insure that the side angle frame connectors and ridge angle frame connectors will be automatically aligned at four foot on centers.

It is to be noted that the edge and ridge boards 28, 30 and 26 are not required for structural integrity of the arches 10. The edge and ridge boards serve to tie the arches into a unitary frame structure and also serve as fastening members for the roofing material that will be added to complete an enclosed structure.

The frame system, in a very simple configuration, could be assembled in four foot modules so that base frame connectors 16 would be secured to the base frame on four foot centers. This simplified configuration could be suitable for storage sheds and the like. Thus, if the structure were 12 feet in length, there might be four arches 10 provided; one arch at each end and two arches located at ⅓ intervals inward from the end arches, so that there would be provided an arch 10 at four foot intervals from one end of the structure to the other. Each board 26, 28, 30 would be twelve feet in length and secured to each of the four arches. For a structure eight feet in length, three arches would be provided and the ridge and edge boards would be eight feet in length. For a structure sixteen feet in length, five arches would be provided and the ridge and edge boards would be sixteen feet in length. For a structure six feet wide, the rib boards would be about thirty-six inches in length. For a structure eight feet wide, the rib boards would be about fifty inches in length. For a structure ten feet wide, the rib boards would be about sixty-four inches in length. A simplified frame provided by this framing system may be covered with plastic or canvas sheet material to provide an inexpensive roof and wall. It may also be covered with four foot wide panels of plywood, both roof and side walls, since the arches are preferably located four foot on centers. Then the roof, at least, could be further covered with waterproof roofing material. The following tables illustrates how a simplified structure could be specified and provided as a kit or simply provided as a set of instructions for assembling the necessary materials. In the preferred configuration of the angle frame connectors that provide a 120° angle between adjacent lumber segments, a single angle frame connector size suffices.

Figures 13, 14, 15:
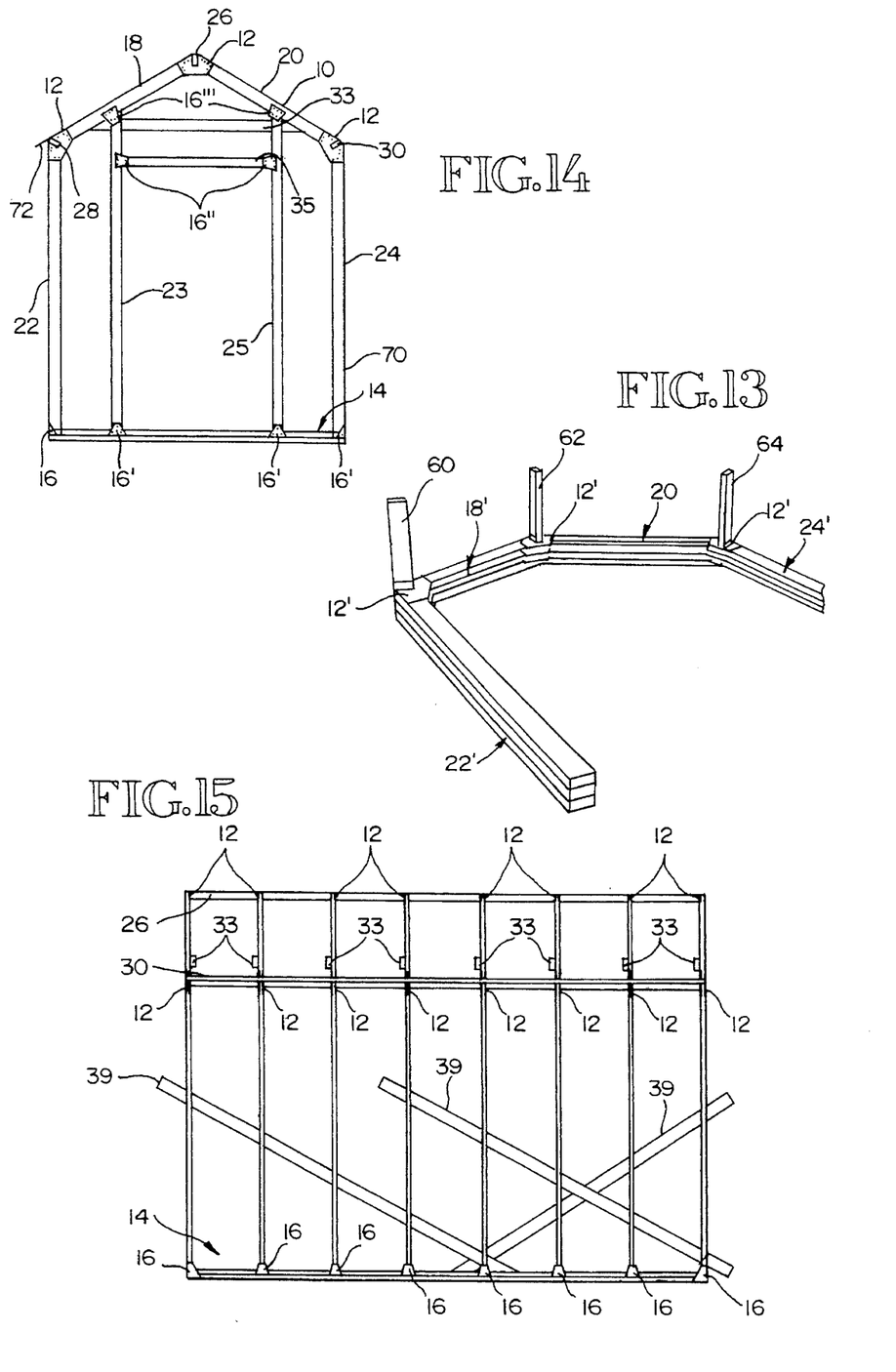
FIG. 13 is a perspective view illustrating an assembly technique for insuring the uniformity of a plurality of arches constructed with angle frame connectors.
FIG. 14 is an end elevation view of a framework assembled with angle frame connectors and base frame connectors.
FIG. 15 is a side elevation view of the FIG. 14 framework.

In FIGS. 13–15, a more complicated configuration employing the framing system of this invention is illustrated. In this configuration, the assembled arches 10 are located on two foot centers, as would be the case in conventional construction. The front arch, illustrated in FIG. 14, would be configured as heretofore described and, additionally, would be provided with a pair of door jambs 23, 25 that would be secured to the base 14 by means of base frame connectors 16' and to the rafters 18, 20 by means of base frame connectors 16'''; and would be provided with a door header 35 that would be secured to the door jambs 23, 25 by means of base frame connectors 16''. As in conventional construction, the rafter assemblies may be braced by crossties 33 appropriately secured to the rafters 28, 20. During the installation process, the individual arches may be temporarily held in position by temporary bracing 39 until the edge/ridge boards were installed and fastened to the arches. Appropriate siding, such as 4'×8' plywood sheathing 70 could be attached to the exterior, and appropriate roofing material 72 could be attached to the rafters.

To assist in the assembly of identical arch configurations, the technique illustrated in FIG. 13 could be employed. In this technique, an arch would be assembled with the angle frame connectors on one side of the arch members; then that arch would be turned over and short segments of lumber (normally nominal 2×4 inch lumber) would be inserted in the angle frame connector slots 19 to help align the opposing-side angle frame connectors. Then the opposing-side angle frame connectors would be attached to the other side of the arch members. This fully assembled arch would then become the pattern or template for the assembly of the remaining arches. Leaving the short lumber segments 60, 62 and 64 in place as shown in FIG. 13, the remaining arches would be assembled over the previously-assembled arches; FIG. 13 illustrating three such arches stacked one on top of the other. By using this technique, the builder insures that each of the arch legs 22', 24' and each of the rafter segments 18', 20' and each of the angle frame connectors 12' are aligned so that the arches are identical to one another after the assembly process is completed. By requiring the assembly process to involve the short lumber segments, 60, 62 and 64, it is assured that the angle frame connectors 12' will be aligned properly so that the edge and ridge boards, 28, 30 and 28 for insertion into the angle frame connectors slots 19.

The following Tables of Structure Specifications illustrate some typical examples for construction of various kinds of buildings.

Tables of Structure Specifications

Table I

Material List for 6'×8' structure (Three Arch Sets, 4' on centers)

Base Materials

2—2"×4"×65" Kiln dried lumber
2—2"×4"×72" Kiln dried lumber
2—2"×4"×83" Kiln dried lumber
2—2"×4"×96" Kiln dried lumber Arch Sets—(Three Each on Four Foot Centers)

3—2"×4"×96" Kiln dried lumber Ridge/Edge Boards
6—2"×4"×36½" Kiln dried lumber Roof Rib Boards
6—2"×4"×60" Kiln dried lumber Leg Boards
9—Angle Frame Connectors
6—Base Frame Connectors Door Frame 2—2"×4"×96" Vertical Boards
2—2"×4"×72" Cross Boards Miscellaneous 2" nails and multi-purpose screws
Sheathing and Roofing Materials Table II Material List for 8'×14' structure (Eight Arch Sets, 2' on centers)

Base Materials

2—2"×4"×14' Kiln dried lumber
2—2"×4"×7'4" Kiln dried lumber
2—2"×4"×13'5" Pressure-treated lumber
2—2"×4"×7'11" Pressure-treated lumber Arch Sets—(Eight Each on Four Foot Centers)

3—2"×4"×14' Kiln dried lumber Ridge/Edge Boards
16—2"×4"×4'1⅛" Kiln dried lumber Roof Rib (Rafter) Boards
16—2"×4"×7'6¼" Kiln dried lumber Leg (Stud) Boards
8—2"×4"×6' Kiln dried lumber cross ties
48—Angle Frame Connectors
16—Base Frame Connectors Door Frame/Back Wall 2—2"×4"×8'6¼ Vertical Boards (Door Jambs)
1—2"×4"×4' Cross Board (Door Header)
2—2"×4"×120" Vertical Boards for Back Wall Frame
10—Base Frame Connectors

Miscellaneous

6—1"×4"×8' Bracing Boards
16 Sheets of 4'×8' Sheathing Material
2#16d Nails
3#1'¼" Deck Screws
150 Sq. Ft. Roofing Material While the preferred embodiment of the invention has been described herein, variations in the design may be made.

Figure 6:
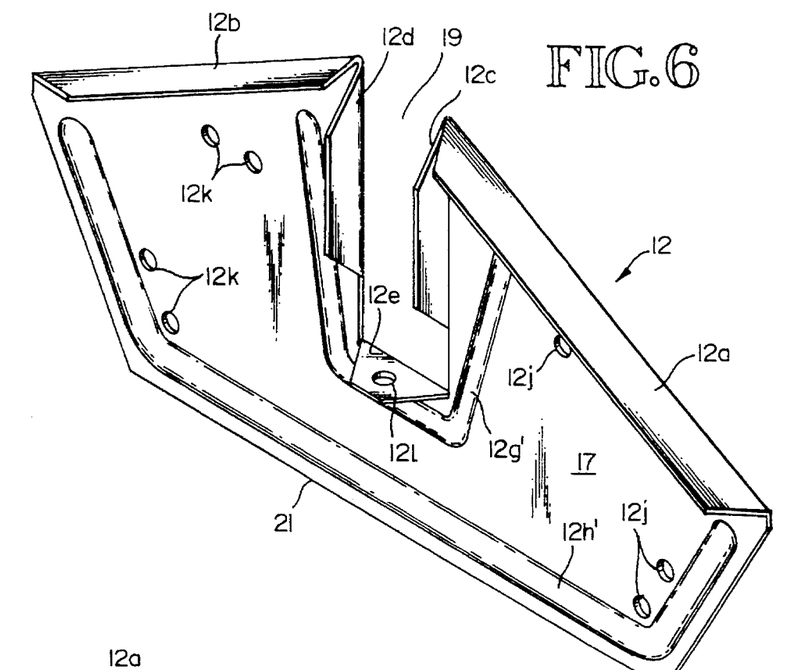
FIG. 6 is a view in perspective of the preferred angle frame connector illustrating its inside configuration.
Figure 7:
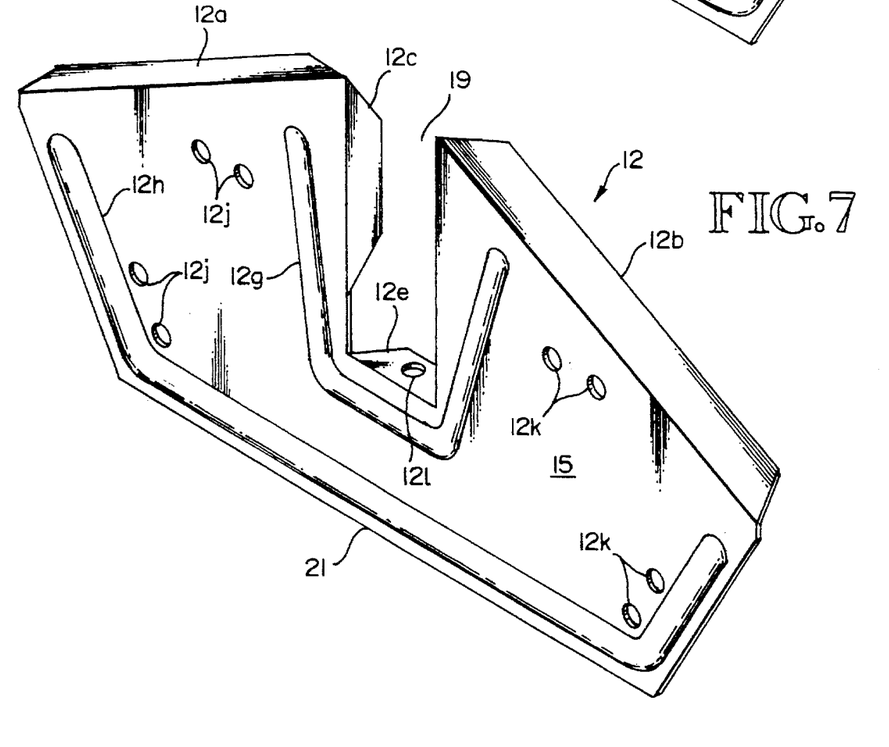
FIG. 7 is a view in perspective of the preferred angle frame connector illustrating its outside configuration.

The angle frame connectors could be fabricated, for example, with tabs 12c, 12d and 12e bent outward, rather than inward as shown. Orienting these tabs, 12c, d and e, outward at a right angle extending from the angle frame connectors outer surface 15, (or orienting them inward at a right angle extending from the inner surface 17 as seen in FIGS. 6–7), is a matter of choice. Some suppliers might prefer one version over the other, and both are within the scope of this invention. Also, tabs 12c, d and e could be oriented so that tabs 12c–d extended inward and tab 12e extended outward, or vice versa, again depending on one's preference. Also, for example, the pair of angle frame connectors, for example, could be fabricated so as to be formed from a single sheet of sheet metal; in which case the inner/lower edge 21 of each of the connectors 12 would be connected by a web having a width equal to the nominal thickness of the rib/leg board that the pair would engage. In this configuration, each connector 12 would be bent at a right angle to the connecting web along their respective edges 21. This configuration, wherein the two connectors are connected by a web is illustrated in FIG. 12 in dotted line at 27, the web being designated 29; illustrating that this configuration of a connecting web 29 is an alternative. The scope of the invention, therefore, is only to be limited by the claims appended hereto. The embodiments of the invention in which an exclusive property is claimed are defined as follows:

We claim:

1. An angle frame connector for joining lumber segments comprising a plate having (i) a first side portion for receiving an end portion of a first lumber segment oriented parallel to the connector, (ii) a second side portion for receiving an end portion of a second lumber segment oriented parallel to the connector and co-planar with the first lumber segment, and (iii) a central portion for receiving a third lumber segment oriented transversely to the connector and transversely to the first and second lumber segments; said plate having an inner side and an outer side, and having a plurality of peripheral tabs extending at 90° from the inner side, said peripheral tabs including (i) a first aligning tab extending along a first edge of said plate on said first side portion, (ii) a second aligning tab extending along a second edge of said plate on said second side portion, the two tabs being oriented at an obtuse angle relative to one another, (iii) a pair of parallel side tabs and a bottom tab defining a three-sided rectangular slot in said central portion between the first and second aligning tabs; said first and second aligning tabs and said slot being constructed and arranged whereby an outer edge of said plate is defined by said first and second aligning tabs as having two straight edges extending at an obtuse angle with respect to one another and terminating at opposite outer edges of said slot.

2. The angle frame connector of claim 1 wherein said plate is provided with first and second reinforcing ribs formed therein such that each reinforcing rib defines a flute in said inner side and a corresponding bead in said outer side, the first reinforcing rib being located in said central portion and extending around said slot, and the second reinforcing rib extending across the side and central portions of said plate.

3. A framing arch comprising a pair of lumber leg segments, a pair of lumber roof rib segments, and angle frame connectors joining each leg segment to a roof rib segment and joining one roof rib segment to another roof rib segment; each angle frame connector comprising a plate having (i) a first side portion for receiving an end portion of a first lumber segment oriented parallel to the connector, (ii) a second side portion for receiving an end portion of a second lumber segment oriented parallel to the connector and co-planar with the first lumber segment, and (iii) a central portion for receiving a third lumber segment oriented transversely to the connector and transversely to the first and second lumber segments; said plate having inner side and an outer side, and having a plurality of peripheral tabs extending at 90° from the inner side, said peripheral tabs including (i) a first aligning tab extending along a first edge of said plate on said first side portion, (ii) a second aligning tab extending along a second edge of said plate on said second side portion, the two tabs being oriented at an obtuse angle relative to one another, (iii) a pair of parallel side tabs and a bottom tab defining a three-sided rectangular slot in said central portion between the first and second aligning tabs; said first and second aligning tabs and said slot being constructed and arranged whereby an outer edge of said plate is defined by said first and second aligning tabs as having two straight edges extending at an obtuse angle with respect to one another and terminating at opposite outer edges of said slot.

4. The framing arch of claim 3 wherein said plate is provided with first and second reinforcing ribs formed therein such that each reinforcing rib defines a flute in said inner side and a corresponding bead in said outer side, the first reinforcing rib being located in said central portion and extending around said slot, and the second reinforcing rib extending across the side and central portions of said plate.

5. The framing arch of claim 3 including a lumber base and a pair of base frame connectors, each base frame connector joining a leg segment to the base; each base frame connector comprising a plate having first and second side portions and a central portion, said plate having an inner side and an outer side, and said side portions being adapted for fastening to the base and said central portion being adapted for fastening to the base and to a leg segment; said plate having a pair of parallel ribs formed therein such that each rib defines a flute in said inner side and a corresponding bead in said outer side; said parallel ribs defining parallel vertical edges of said central portion and being so constructed and arranged that a selected side portion may be bent at 90° to said inner side along an adjacent one of said parallel ribs whereby the bent side portion may be attached to an end of said base.

6. A framing system comprising a base frame and multiple framing arches attached to said base frame at selected intervals wherein each framing arch comprises a pair of lumber leg segments, a pair of lumber roof rib segments, angle frame connectors joining each leg segment to a roof rib segment and joining one roof rib segment to another roof rib segment, base frame connectors joining each leg segment to said base frame, and lumber edge segment and a lumber ridge segment;

each angle frame connector comprising a plate having (i) a first side portion for receiving an end portion of a first lumber segment oriented parallel to the connector, (ii) a second side portion for receiving an end portion of a second lumber segment oriented parallel to the connector and co-planar with the first lumber segment, and (iii) a central portion for receiving a third lumber segment oriented transversely to the connector and transversely to the first and second lumber segments; said plate having an inner side and an outer side, and having a plurality of peripheral tabs extending at 90° from the inner side, said peripheral tabs including (i) a first aligning tab extending along a first edge of said plate on said first side portion, (ii) a second aligning tab extending along a second edge of said plate on said second side portion, the two tabs being oriented at an obtuse angle relative to one another, (iii) a pair of parallel side tabs and a bottom tab defining a three-sided rectangular slot in said central portion between the first and second aligning tabs; said first and second aligning tabs and said slot being constructed and arranged whereby an outer edge of said plate is defined by said first and second aligning tabs as having two straight edges extending at an obtuse angle with respect to one another and terminating at opposite outer edges of said slot;

each base frame connector comprising a plate having first and second side portions and a central portion, said plate having an inner side and an outer side, and said side portions being adapted for fastening to the base frame and said central portion being adapted for fastening to the base frame and to a leg segment; said plate having a pair of parallel ribs formed therein such that each rib defines a flute in said inner side and a corresponding bead in said outer side; said parallel ribs defining parallel vertical edges of said central portion and being so constructed and arranged that a selected side portion may be bent at 90° to said inner side along an adjacent one of said parallel ribs whereby the bent side portion may be attached to an end of said base frame; and said edge segments extending transversely of said framing arches with each edge segment being mounted in the angle frame connectors that join leg segments to roof rib segments on one side of said framing system; and said ridge segment extending transversely of said framing arches and being mounted in the angle frame connectors that join one roof rib segment to another roof rib segment.

* * * * *